US012756028B2

(12) United States Patent
Nuernberger

(10) Patent No.: US 12,756,028 B2
(45) Date of Patent: Oct. 6, 2026

(54) METHOD FOR OPERATING A HEATING ARRANGEMENT FOR A HIGH-VOLTAGE STORAGE MODULE FOR A MOTOR VEHICLE

(71) Applicant: Bayerische Motoren Werke Aktiengesellschaft, Munich (DE)

(72) Inventor: Simon Nuernberger, Bad Aibling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/728,128

(22) PCT Filed: Feb. 16, 2023

(86) PCT No.: PCT/EP2023/053849

§ 371 (c)(1),
(2) Date: Jul. 11, 2024

(87) PCT Pub. No.: WO2023/174627

PCT Pub. Date: Sep. 21, 2023

(65) Prior Publication Data

US 2025/0105390 A1 Mar. 27, 2025

(30) Foreign Application Priority Data

Mar. 16, 2022 (DE) ..................... 10 2022 106 066.7

(51) Int. Cl.
*H01M 10/615* (2014.01)
*B60L 58/27* (2019.01)
(Continued)

(52) U.S. Cl.
CPC ........... *H01M 10/615* (2015.04); *B60L 58/27* (2019.02); *H01M 10/625* (2015.04);
(Continued)

(58) Field of Classification Search
CPC .. H01M 10/615; H01M 10/625; H01M 10/63; H01M 10/6568; H01M 10/6571;
(Continued)

(56) References Cited

U.S. PATENT DOCUMENTS 9,535,132 B2 * 1/2017 Inguva .................. B60L 3/0046
10,180,464 B2 * 1/2019 Saint-Marcoux .... G01R 31/392
(Continued)

FOREIGN PATENT DOCUMENTS

CN 106684501 A 5/2017
DE 10 2012 219 747 A1 5/2013
(Continued)

OTHER PUBLICATIONS

International Search Report (PCT/ISA/210) issued in PCT Application No. PCT/EP2023/053849 dated May 30, 2023 with English translation (7 pages).
(Continued)

*Primary Examiner* — Mussa A Shaawat
(74) *Attorney, Agent, or Firm* — Crowell & Moring LLP

(57) ABSTRACT

The present disclosure relates to a method for operating a heating arrangement for a high-voltage storage module for a motor vehicle, the heating arrangement having a fluid heater and a resistance heater which can be arranged in intermediate spaces formed by battery cells.

11 Claims, 2 Drawing Sheets

(51) Int. Cl.

| | |
|---|---|
| ***H01M 10/625*** | (2014.01) |
| ***H01M 10/63*** | (2014.01) |
| ***H01M 10/6568*** | (2014.01) |
| ***H01M 10/6571*** | (2014.01) |
| ***H05B 1/02*** | (2006.01) |

(52) U.S. Cl.
CPC ....... *H01M 10/63* (2015.04); *H01M 10/6568* (2015.04); *H01M 10/6571* (2015.04); *H05B 1/0252* (2013.01); *H01M 2220/20* (2013.01)

(58) Field of Classification Search
CPC .......... H01M 2220/20; H01M 10/6557; B60L 58/27; B60L 50/64; H05B 1/0252; Y02E 60/10
See application file for complete search history.

(56) References Cited

U.S. PATENT DOCUMENTS

| | | | | |
|---|---|---|---|---|
| 10,310,022 | B2* | 6/2019 | Park | G01R 31/392 |
| 10,921,383 | B2* | 2/2021 | Pajovic | G06N 5/04 |
| 11,577,625 | B1* | 2/2023 | Foland | G06N 20/20 |
| 2010/0104927 | A1* | 4/2010 | Albright | B60L 50/64 429/50 |
| 2012/0003510 | A1* | 1/2012 | Eisenhour | H01M 10/625 429/50 |
| 2013/0020864 | A1* | 1/2013 | Smajlovic | B60H 1/00657 307/9.1 |
| 2013/0108897 | A1 | 5/2013 | Christian et al. | |
| 2015/0046109 | A1* | 2/2015 | Miwa | H01M 10/482 702/63 |
| 2016/0197384 | A1* | 7/2016 | DeKeuster | H01M 50/571 429/120 |
| 2016/0211558 | A1* | 7/2016 | Ma | H01M 10/654 |
| 2019/0067763 | A1* | 2/2019 | Ing | H01M 10/04 |
| 2020/0011932 | A1* | 1/2020 | Hooshmand | H01M 10/482 |
| 2021/0188127 | A1* | 6/2021 | Klose | H02J 7/00309 |
| 2021/0320347 | A1* | 10/2021 | Antwerpen | H01M 10/613 |
| 2021/0367288 | A1 | 11/2021 | Tong et al. | |
| 2022/0123383 | A1* | 4/2022 | Lee | H01M 50/262 |
| 2022/0131209 | A1* | 4/2022 | Bartling | H01M 10/613 |
| 2022/0149645 | A1* | 5/2022 | Ramanujam | B60L 58/27 |

FOREIGN PATENT DOCUMENTS

| | | | |
|---|---|---|---|
| DE | 10 2013 012 164 | A1 | 1/2015 |
| DE | 10 2016 015 288 | A1 | 7/2017 |
| DE | 10 2017 000 265 | A1 | 7/2017 |
| DE | 10 2017 221 829 | B3 | 4/2019 |
| DE | 10 2020 109 872 | B3 | 3/2021 |
| DE | 10 2021 122 336 | A1 | 3/2023 |
| WO | WO 2015/035406 | A1 | 3/2015 |

OTHER PUBLICATIONS

German-language Written Opinion (PCT/ISA/237) issued in PCT Application No. PCT/EP2023/053849 dated May 30, 2023 with English translation (8 pages).
German-language Search Report issued in German Application No. 10 2022 106 066.7 dated Nov. 30, 2022 with partial English translation (10 pages).

* cited by examiner

METHOD FOR OPERATING A HEATING ARRANGEMENT FOR A HIGH-VOLTAGE STORAGE MODULE FOR A MOTOR VEHICLE

BACKGROUND AND SUMMARY

The present disclosure relates to a method for operating a heating arrangement for a high-voltage storage module for a motor vehicle, wherein the heating arrangement has a fluid heater and a resistance heater, which can be arranged in intermediate spaces formed by battery cells.

To provide electrical energy when supplying electric drives of vehicles, high-voltage stores, also designated drive batteries or drive accumulators, are known. The output capacity of lithium-iron accumulators is temperature-dependent. In particular in cells with high energy densities or with manganese-rich cell chemistry or when solid electrolytes are used, this temperature-dependence of the output is always more pronounced: the lower the cell temperature, the lower the output that can be retrieved. Classic heating concepts require a high level of outlay on integration in order to bring the heating energy as closely and efficiently as possible to the battery cell. The cooling concept usually collides with the necessary installation space of the heating structure.

In current high-voltage storage structures of electric vehicles, battery cells are cooled and/or heated, for example, by means of cooling coils with cooling liquid between the battery cells, on the battery cells or underneath the battery cells, heat-conducting plates with attachment to the liquid cooling between the battery cells, on the battery cells or underneath the battery cells, or battery cells around which liquid flows in the form of “immersion cooling” or “immersion heating”. In these devices, the cooling liquid can also be heated by means of applied heating in order to achieve heating of the battery cells.

Against this background, it is an object of the present disclosure to improve a method for operating a heating arrangement for a high-voltage storage module for a motor vehicle. In particular, operation of a heating arrangement is to be improved, in order to permit harmonized heating of the high-voltage storage module.

This object is achieved by a method for heating a heating arrangement for a high-voltage storage module for a motor vehicle, having the features of the independent claim. The dependent claims relate to advantageous refinements of the present disclosure.

According to a first aspect, a method for operating a heating arrangement for a high-voltage storage module for a motor vehicle is proposed, wherein the heating arrangement has a fluid heater and a resistance heater, which can be arranged in intermediate spaces formed by battery cells, comprising the steps of determining an operating requirement of the high-voltage storage module and of operating the resistance heater and/or the fluid heater depending on the operating requirement.

In this way, a relationship between an operating requirement of the high-voltage storage module and a heating output that can be imparted to the high-voltage storage module by the resistance heater and/or the fluid heater can be produced, in order to permit improved heating or temperature control of the high-voltage storage module or its battery cells. Thus, for example, the resistance heater or the fluid heater can be operated on their own or the resistance heater can be operated together with the fluid heater, in particular for the optimal utilization of the two heating outputs, to achieve homogenous heating of the high-voltage storage module. To this end, the fluid heater and the resistance heater can be actuated separately from each other or together by means of a control unit, in particular depending on the operating requirement.

A high-voltage storage module is in particular an energy store or a drive battery or drive accumulator, which in particular has a plurality of modules with battery cells wired in parallel and series. Here, use is made in particular of cylindrical battery cells, which are provided in particular in hexagonal packing arrangements. The number of battery cells used can have a direct relationship with a range of an electric or hybrid vehicle and provide an operating voltage of, for example, 400 or 800 V.

Battery cells in such high-voltage storage modules are arranged in particular in adjacent rows of cells that are offset relative to one another. Here, two rows of adjacent cells arranged offset relative to one another is to be understood in particular that the battery cells of the adjacent rows of cells-based on the longitudinal axis of the intermediate space—are arranged with identical spacing below one another at different positions which result from hexagonal packing. As a result, the battery cells of adjacent rows can be arranged closer to one another, so that the result for the intermediate space is a wavy and/or slightly meandering longitudinal shape, since corresponding cells of the adjacent rows of cells would intersect one another if they were not to be arranged offset relative to one another.

A fluid heater is in particular a known fluid cooling device which is configured to heat the high-voltage storage module. Accordingly, the fluid heater is configured to transport a liquid, in particular heated by means of a continuous-flow heater, to the battery cells, in order to permit a heat transfer there. In order to heat the battery cells or the high-voltage storage module, the fluid heater is arranged in intermediate spaces between battery cells, and in particular designed as a fluid cooling or heating coil. For example, heating elements of the fluid heater can be arranged or arrangeable in parallel and/or meandering fashion between the battery cells.

The fluid heater typically has a heating output of approximately 3 to 7 Watts of heating output per battery cell. This heating output can be increased considerably by additional use of the resistance heater, in order to permit improved heating for the high-voltage storage module.

A resistance heater is configured to convert electrical energy into thermal energy (heat) and, in particular, designed as a non-reactive heater. The resistance heater can be designed in coil form, analogous to the fluid heater. For example, individual heating elements can be arranged or arrangeable in parallel and/or meandering fashion between the battery cells and plug-connectable in order to be connected to a bus bar for the electrical supply. The resistance heater can be configured to provide approximately 20 to 40 Watts heating output, in particular up to a maximum of 60 Watts heating output, for one battery cell.

The fluid heater and the resistance heater can be arranged alternately in the intermediate spaces between the battery cells, so that a first side of the battery cell faces the fluid heater and a second, opposite, side of the battery cell faces the resistance heater. The fluid heater and the resistance heater can be designed with their external geometry substantially corresponding to one another, in order to form a structural reinforcement of the high-voltage storage module and/or a positional establishment of the battery cells relative to one another, in particular in the sense of spacers.

One operating requirement is in particular a target variable, in particular a retrievable (target) output of the high-voltage storage module or the battery cells, which can be achieved by means of an operation of the heating arrangement. For example, such an operating requirement can be a working temperature, such as a minimum temperature for improved power transmission, a temperature difference up to an operating temperature or a temperature variation over time. Temperature values can be determined, for example, on the basis of temperature measurements and/or an operating model of the temperature loading of the high-voltage store of a motor vehicle.

Amongst other things, the present disclosure is based on the concept that the performance of lithium-ion accumulators is temperature-dependent. In particular in battery cells with high energy densities or manganese-rich cell chemistry or when solid electrolytes (all solid-state) are used, this temperature dependence of the output is all the more pronounced: the lower the cell temperature, the lower the retrievable output. In particular, the charging direction is highly temperature-dependent, for instance fast-charging functions, for example, only at temperatures of more than approximately +20° C.

The present disclosure is, then, amongst other things based on the idea of utilizing the heating arrangement which, firstly, has a fluid heater and, secondly, a resistance heater, for effective heating of the battery cells or the high-voltage storage module, in order to permit optimized operation of the battery cells or components connected thereto. For this purpose, the most homogenous heating possible of the battery cells is to be carried out by in particular simultaneous activation of the fluid heater and the resistance heater. For example, operation of the fluid heater and the resistance heater coordinated with one another can be provided in order to permit gentle heating of the high-voltage storage module. As a result of determining an operating requirement for the high-voltage storage module, targeted heating can be carried out by means of the fluid heater and/or the resistance heater.

In some implementations, the method can comprise a further step of adjusting a heating output of the resistance heater depending on the operating requirement. The output provided for the heating can be scaled on the basis of the determined operating requirement and, in particular, designed to be variable over time in order to provide a predetermined heating profile or heating characteristic for the battery cells or the high-voltage storage module. Thus, targeted transmission of heat from the resistance heater to the battery cells is made possible in order, for example, to reduce temperature inhomogeneities within the high-voltage storage module, which can occur as a result of sole heating by means of the fluid heater. In particular, as a result of the scalability of the heating output that can be applied by the resistance heater, adaptation to a respective intention or utilization, such as fast charging or adaptation to a predetermined or predefined route, is made possible. Thus, a charging output or energy supply which can be provided by means of the high-voltage storage module can be supported as required.

In some implementations, the operating requirement can be determined depending on operating state of the motor vehicle. An operating state of the motor vehicle can be current or future fast-charging of the high-voltage storage module or a current or future travel route. A travel route can in particular be subdivided into portions, wherein different energy requirements or recuperation characteristics of the high voltage storage module can be necessary or predetermined, depending on the portions of the travel route. For example, complete heating of the high-voltage storage module is not necessary for every travel route, and heating of the high-voltage storage module can thus be matched to the travel route by the proposed method. In addition, conditioning of the high-voltage storage module for fast charging can also be made possible. If, for example, it is known that such fast charging is to be carried out, rapid heating to approximately 20° C., for example, can accordingly be carried out by means of the resistance heater, as a result of which the charging rate can be increased from 20% to approximately 80%.

In some implementations, an operating state can be determined on the basis of a driving profile and/or navigation input. A driving profile can be characterized by a known utilization behavior by a user and, in particular, permit a prediction about a utilization of the vehicle or of the high-voltage storage module. A navigation input is in particular a destination input of a user, in order to obtain one or more route suggestions. On the basis of the destination input, of route suggestions and/or a route selected by the user, for example an energy demand and/or a charging possibility can be determined which, in turn, can be used as a basis for determining the operating requirement. In this way, for example, a requirement for energy supply or a recuperation possibility can be determined, whereupon an operating strategy which corresponds to a heating strategy or a heating profile can be determined and applied. Such a determination can in particular be made by means of a control device or a control apparatus of a motor vehicle and/or of an electric or hybrid drive.

In some implementations, an operating requirement can be a charging operation of the high-voltage storage module. For a charging operation, in particular for a fast-charging operation, an optimal operating temperature for the high-voltage storage module is at least approximately 20° C. By means of the activation of the resistance heater, a heating time from negative levels to approximately 20° C. can be achieved in a heating time of approximately 1 to 3 minutes, which can be to the benefit of accelerated charging of the high-voltage storage module. In order to achieve optimal heating of the high-voltage storage module, for example the fluid heater can be activated at the same time, as a result of which, firstly, a heating operation is accelerated and, secondly, a temperature distribution within the high-voltage storage module can be configured more homogenously.

In some implementations, the operating requirement can be a temperature of the high-voltage storage module. In particular, the operating requirement is a predetermined temperature of the high-voltage storage module, which is based on operating specifications. Alternatively, a temperature can also be determined on the basis of demand, and then used as a basis for determining a heating output to be applied. For this purpose, in particular, a temperature difference between the external temperature and the target temperature of the high-voltage storage module can also be used. To this end, usual devices and methods for temperature measurement can be used. In particular, the store temperature is critical for an optimal result during a fast charging operation, for which region targeted and simultaneously gentle heating of the high-voltage storage module by means of two heating devices may be advantageous.

In some implementations, the resistance heater can be operated independently of the fluid heater. Provision can be made that the resistance heater is actuatable or can be operated individually, without considering the heating output that can be made available by means of the fluid heater. This may be advantageous in particular if a temperature change is to be carried out shortly after starting the motor vehicle, and heating of fluids for the fluid heater by means of a continuous-flow heater cannot be carried out directly to a sufficient extent.

In some implementations, the resistance heater can be operated in sections. For heating of the high-voltage storage module that is matched to the area, provision can be made for the resistance heater to be activated or operated in parts or in subregions. For example, provision can be made for a resistance heater to have a symmetrical division into two subregions, which can be arranged alternately relative to each other, and for one subregion to be configured to transmit a respective half of the total possible heating output from the resistance heater to the battery cells of the high-voltage store. Depending on the operating requirement, either one or both of the subregions can be operated in order to heat the high-voltage storage module. Thus, demand-based operation of the resistance heater can be made possible in order to throttle an available heating output adaptively.

In some implementations, the resistance heater can be operated as a function of time. Alternatively or additionally to the above-described regional operation, the resistance heater can also be operated under time control. For example, the resistance heater can be operated in a pulsed manner or switched on/and off for specific time periods, in order to permit demand-based heating of the high-voltage storage module and in particular to be able to support the fluid heater optimally, to permit the most homogenous and thus gentle heating possible.

In some implementations, the resistance heater can be operated by means of an external energy source. In particular during the charging operation, provision can be made for the resistance heater to be operated by means of the electrical energy provided by the charging station, in order to permit optimized heating of the high-voltage storage module.

In some implementations, the resistance heater can be operated by means of energy from the battery cells. Provision can be made for the battery cells to be heated themselves to provide the energy for the operation or to operate the resistance heater, in order to form a self-feeding heating system for the battery cell. In this way, no matching to an external energy source is necessary, which means that a controller of the heating arrangement can be simplified.

BRIEF DESCRIPTION OF THE DRAWINGS

Further advantages and possible applications of the present disclosure can be gathered from the following description in conjunction with the figures.

DETAILED DESCRIPTION OF THE DRAWINGS

In the following, identical designations relate to identical or at least similar features.

Figure 1:
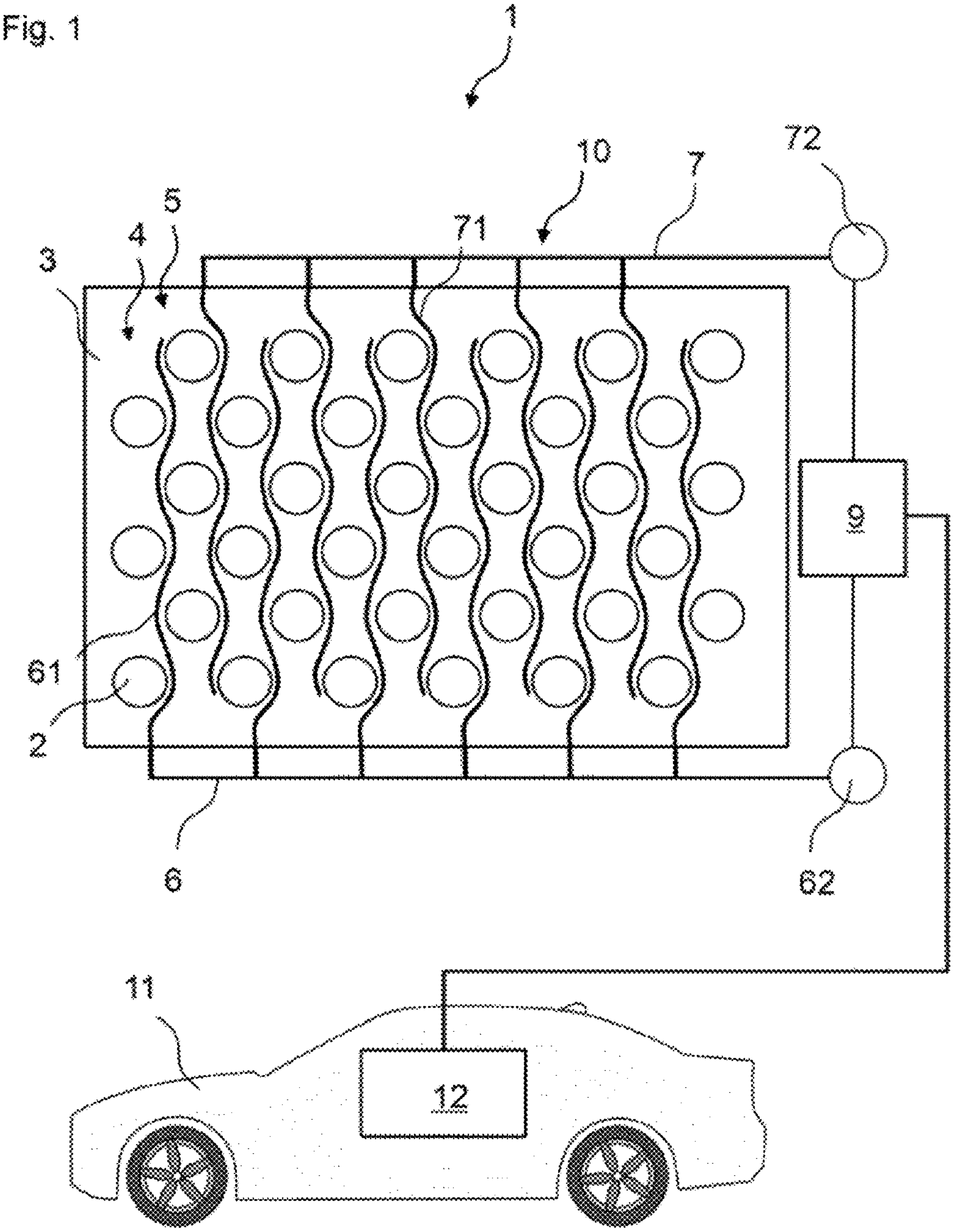
FIG. 1 shows a schematic view of an exemplary embodiment of a high-voltage storage module which can be operated by means of an exemplary embodiment of the method according to the present disclosure.

FIG. 1 shows an example of a high-voltage storage module 1 for a motor vehicle 11, having a multiplicity of battery cells 2 and a heating arrangement 10. The battery cells 2 are packed hexagonally in their packing plane in a storage space 3 of the high-voltage storage module 1; consequently, the individual rows of cells 4 are arranged offset relative to one another. Between each two rows of cells 4, the arrangement therefore has a respective intermediate space 5, of which the longitudinal extent between the adjacent rows of cells has a wavy shape as a result of the hexagonal packing. Since a plurality of rows of cells 4 is provided, the module 1 also has a plurality of intermediate spaces 5 in the packing plane illustrated (which can be the single one or one or of several).

To control the temperature of the high-voltage storage module 1, the latter has the heating arrangement 10 with a fluid heater 6 and a resistance heater 7, wherein a fluid heating coil 6 or a fluid heating element of the fluid heater 6 and a resistance heating coil 71 or a resistance heating element of the resistance heater 7 are arranged alternately in successive intermediate spaces 5.

The adjacent resistance heating element 71, together with an electrical interface 72, form the resistance heater 7. The adjacent fluid heating elements 61, together with a heat exchanger interface 62, form the fluid heater 6. The resistance heater 7 is arranged on a first side of the storage space 3 and resistance heating elements 71 reach from the latter into the intermediate spaces 5 of the high-voltage storage module 1, and the fluid heater 6 is arranged on a second, opposite, side of the storage space 3 and fluid heating elements 61 reach from the latter, alternating with the resistance heating elements 71, into the intermediate spaces 5 of the high-voltage storage module 1.

The fluid heater 6 and the resistance 8 7 are connected to a control unit 9, wherein the control unit 9 is configured to determine an operating requirement of the high-voltage storage module 1 and to operate and actuate the resistance heater 7 and the fluid heater 6 depending on the operating requirement. To determine the operating requirement, the control unit 9 can use data from a vehicle control system 12. In an alternative exemplary embodiment, the vehicle control system 12 can comprise the control unit 9 or be designed to determine the control requirement and/or to control the heating arrangement 10.

Figure 2:
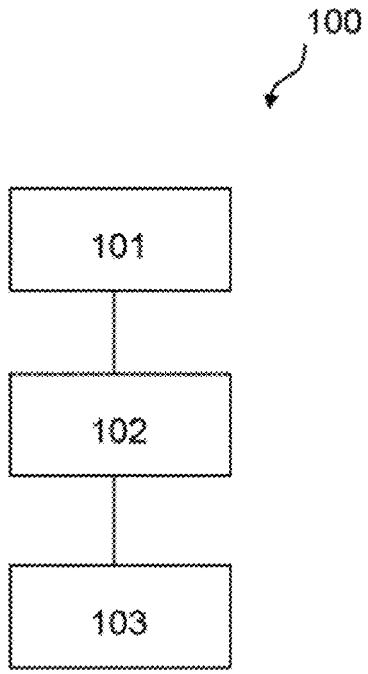
FIG. 2 shows a schematic illustration of a method according to the present disclosure for operating a heating arrangement for a high-voltage storage module for a motor vehicle.

In FIG. 2, an exemplary embodiment of a method 100 according to the present disclosure for operating the heating arrangement 10 for a high-voltage storage module 1 for a motor vehicle from FIG. 1 is illustrated schematically.

In a first step 101, an operating requirement of the high-voltage storage module 10 is determined. For this purpose, for example, use can be made of a navigation input of a user of the motor vehicle, on the basis of which an operating state of the motor vehicle, for example approaching a charging station, is determined. From this, for example, it is possible to determine that the operating requirement is a charging operation of the high-voltage storage module 1, and a predetermined operating temperature for the high-voltage storage module 1 is provided and the high-voltage storage module is to be heated to this predetermined temperature.

On the basis of this operating requirement, in a step 102 the resistance heater 7 and the fluid heater 6 are activated. For this purpose, the resistance heater can be operated by means of an external energy source and/or by means of energy from the battery cells 2.

In a further step 103, a heating output of the resistance heater 7 is adjusted depending on the operating requirement. For this purpose, the resistance heater can be operated in sections, that is to say for example in some regions, and/or operated time-dependently, for example in a pulsed manner, in order to ( . . . ) the heating output of the resistance heater 7 to heat the battery cells 2 of the high-voltage storage module 1 as gently and homogenously as possible to the desired operating temperature. In alternative exemplary embodiments, steps 102 and 103 can be carried out simultaneously or in an amended order in order to achieve improved heating of the high-voltage storage module 1.

LIST OF REFERENCE SIGNS

1 High-voltage storage module
2 Battery cell
3 Storage space
4 Row of cells
5 Intermediate space
6 Fluid heater
7 Resistance heater
9 Control unit
10 Heating arrangement
61 Fluid heating element
62 Interface
71 Resistance heating element
72 Interface
100 Method
101, 102, 103 Steps of an exemplary method

The invention claimed is:

1. A method comprising:

providing a heating arrangement for a high-voltage storage module for a motor vehicle, wherein the heating arrangement has a fluid heater and a resistance heater, which are both arranged in intermediate spaces formed by battery cells;

determining an operating requirement of the high-voltage storage module; and operating the resistance heater and the fluid heater arranged in intermediate spaces formed by battery cells depending on the operating requirement.

2. The method of claim 1, further comprising:

adjusting a heating output of the resistance heater depending on the operating requirement.

3. The method of claim 1, wherein the operating requirement is determined depending on an operating state of a motor vehicle.

4. The method of claim 3, wherein an operating state is determined on the basis of a navigation input.

5. The method of claim 1, wherein an operating requirement is a charging operation of the high-voltage storage module.

6. The method of claim 1, wherein the operating requirement is a temperature of the high-voltage storage module.

7. The method of claim 1, wherein the resistance heater is operated independently of the fluid heater.

8. The method of claim 1, wherein the resistance heater is operated in sections.

9. The method of claim 1, wherein the resistance heater is operated as a function of time.

10. The method of claim 1, wherein the resistance heater is operated by means of an external energy source.

11. The method of claim 1, wherein the resistance heater (7) is operated by means of energy from the battery cells.

* * * * *